United States Patent
Jung (10) Patent No.: US 12,220,989 B2
(45) Date of Patent: Feb. 11, 2025

(54) CONTROL SYSTEM AND METHOD FOR FUEL CELL VEHICLE

(71) Applicants: Hyundai Motor Company, Seoul (KR); Kia Corporation, Seoul (KR)

(72) Inventor: Jae Won Jung, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 162 days.

(21) Appl. No.: 17/983,323

(22) Filed: Nov. 8, 2022

(65) Prior Publication Data

US 2024/0001774 A1    Jan. 4, 2024

(30) Foreign Application Priority Data

Jul. 4, 2022   (KR) .................. 10-2022-0081883

(51) Int. Cl.

| | |
|---|---|
| *H02P 1/00* | (2006.01) |
| *B60L 7/18* | (2006.01) |
| *B60L 15/20* | (2006.01) |
| *B60L 50/75* | (2019.01) |
| *B60L 58/12* | (2019.01) |
| *H02P 1/28* | (2006.01) |
| *H02P 3/00* | (2006.01) |
| *H02P 7/06* | (2006.01) |

(52) U.S. Cl.
CPC ............. *B60L 15/2009* (2013.01); *B60L 7/18* (2013.01); *B60L 50/75* (2019.02); *B60L 58/12* (2019.02); *B60L 2240/12* (2013.01); *B60L 2240/423* (2013.01); *B60L 2250/26* (2013.01); *B60Y 2300/18125* (2013.01)

(58) Field of Classification Search
CPC ...... B60L 15/2009; B60L 58/12; B60L 50/75; B60L 7/18
USPC ........................................................ 318/376
See application file for complete search history.

(56) References Cited

U.S. PATENT DOCUMENTS

| | | | | |
|---|---|---|---|---|
| 5,905,349 | A * | 5/1999 | Farkas ...................... | B60L 7/18 318/432 |
| 6,278,916 | B1 * | 8/2001 | Crombez .................. | B60L 7/26 701/84 |
| 10,675,985 | B2 | 6/2020 | Matsuo | |
| 11,305,773 | B1 * | 4/2022 | Semenov ................ | B60T 7/042 |
| 2009/0260901 | A1 * | 10/2009 | Ishii ..................... | B60L 15/2036 701/70 |
| 2016/0318501 | A1 * | 11/2016 | Oldridge ............... | B60W 20/12 |

FOREIGN PATENT DOCUMENTS

| | | |
|---|---|---|
| KR | 20110033620 A | 3/2011 |
| KR | 20210156392 A | 12/2021 |

* cited by examiner

*Primary Examiner* — Erick D Glass
(74) *Attorney, Agent, or Firm* — SLATER MATSIL, LLP (57) ABSTRACT

A control system for a fuel cell vehicle includes a driving motor of the fuel cell vehicle, a brake system of the fuel cell vehicle, and a controller configured to derive a required target regenerative braking torque when the fuel cell vehicle rolls in an opposite direction to a traveling direction on a slope and, when an available regenerative braking torque of the driving motor is less than the required target regenerative braking torque, control the brake system to generate braking torque by as much as a difference between the required target regenerative braking torque and the available regenerative braking torque.

20 Claims, 4 Drawing Sheets

CONTROL SYSTEM AND METHOD FOR FUEL CELL VEHICLE

CROSS-REFERENCE TO RELATED APPLICATIONS

This application claims the benefit of Korean Patent Application No. 10-2022-0081883, filed on Jul. 4, 2022, which application is hereby incorporated herein by reference.

TECHNICAL FIELD

The present disclosure relates to a control system and method for a fuel cell vehicle.

BACKGROUND

Eco-friendly vehicles such as a fuel cell vehicle are decelerated through regenerative braking. Regenerative braking means recovering kinetic energy of a vehicle by converting the kinetic energy into electrical energy through an electric motor connected to the wheels of the vehicle. Electrical energy that is generated through regenerative braking when an eco-friendly vehicle is decelerated is used to charge a battery in the vehicle.

In general, when a vehicle rolls forward or backward on a slope, the driver stops the vehicle by depressing the brake pedal or accelerates the vehicle by depressing the accelerator pedal to escape against rolling. When a driver escapes a rolling situation of a vehicle by depressing the accelerator pedal, in an eco-friendly vehicle including an electric motor, generative braking is performed in the deceleration period, and after the regenerative braking, the vehicle escapes a rolling situation through acceleration. However, when the battery in an eco-friendly vehicle cannot be charged, is overcharged, or the like, electrical energy cannot be recovered through regenerative braking, thus torque that is generated by regenerative braking is prevented. In this case, there is a problem that when a vehicle rolls forward or backward, the vehicle cannot escape from the rolling situation due to prevention of torque even though the vehicle is accelerated.

Meanwhile, a fuel cell vehicle is equipped with a small-capacity high-voltage battery and an electric motor. Accordingly, a fuel cell vehicle also cannot escape rolling in the opposite direction to the traveling direction without recovering the energy that is generated through regenerative braking. However, since the capacity of the high-voltage battery of a fuel cell vehicle is small, there is a problem that such a fuel cell vehicle is frequently exposed to the situation that the battery cannot be charged, is overcharged, or the like, and regenerative braking energy is not sufficiently recovered due to non-chargeability or overcharging. At present, an allowable recovery range of regenerative braking energy is set when a fuel cell vehicle is moved at a low speed. When a vehicle rolls at a low speed on a slope, regenerative braking energy can be recovered within an allowable recovery range, whereby a driver can escape a rolling situation by accelerating. However, when speed of the vehicle that is rolling increases on a slope, regenerative braking energy exceeds an allowable recovery range and accelerating is impossible, so there is a problem that the vehicle cannot escape the rolling situation. Further, since the vehicle cannot escape the rolling situation on a slope, the speed of the vehicle that is rolling increases on a slope.

The description provided above as related to embodiments of the present disclosure is just for helping understanding the background of embodiments of the present disclosure and should not be construed as being included in the related art known by those skilled in the art.

SUMMARY

The present disclosure relates to a control system and method for a fuel cell vehicle. Particular embodiments relate to a control system and method for a fuel cell vehicle that enables a fuel cell vehicle to escape a rolling situation by generating regenerative torque by controlling a brake system as much as insufficient regenerative braking torque when the fuel cell vehicle rolls in the opposite direction to the traveling direction and available regenerative braking torque of a driving motor is insufficient in comparison to target regenerative braking torque.

Embodiments of the present disclosure can solve problems in the art and an embodiment of the present disclosure provides a control system and method for a fuel cell vehicle that enables a fuel cell vehicle to escape a rolling situation by generating regenerative torque by controlling a brake system as much as insufficient regenerative braking torque when the fuel cell vehicle rolls in the opposite direction to the traveling direction and available regenerative braking torque of a driving motor is insufficient in comparison to target regenerative braking torque.

A control system for a fuel cell vehicle according to embodiments of the present disclosure includes a driving motor of the fuel cell vehicle, brake system of the fuel cell vehicle, and a controller configured to derive required target regenerative braking torque when the fuel cell vehicle rolls in an opposite direction to a traveling direction on a slope and configured to control the brake system to generate braking torque as much as insufficient regenerative braking torque when available regenerative braking torque of the driving motor is insufficient in comparison to the target regenerative braking torque.

When the fuel cell vehicle rolls, the controller may derive target regenerative braking torque according to a propelling requirement value and a vehicle speed of the fuel cell vehicle.

The propelling requirement value of the fuel cell vehicle may be a sensing value of an accelerator position sensor (APS).

The controller may have a data map that outputs corresponding target regenerative braking torque when the propelling requirement value and the vehicle speed of the fuel cell vehicle are input.

The control system may further include a battery configured to store electrical energy that is generated when regenerative braking is performed in the fuel cell vehicle, in which the controller may calculate available regenerative braking torque of the driving motor on the basis of a state of charge of the battery.

When available regenerative braking torque of the driving motor is insufficient in comparison to target regenerative braking torque, the controller may control the driving motor to be driven with minimum allowable regenerative braking torque.

The minimum allowable regenerative braking torque may be a minimum value of regenerative braking torque of the driving motor that is unconditionally allowed regardless of the state of charge of the battery in a period in which the vehicle speed of the fuel cell vehicle is low.

A control method for a fuel cell vehicle according to embodiments of the present disclosure includes deriving required target regenerative braking torque by a controller when the fuel cell vehicle rolls in an opposite direction to a traveling direction on a slope and generating braking torque as much as insufficient regenerative braking torque by controlling a brake system by the controller when available regenerative braking torque of a driving motor is insufficient in comparison to target regenerative braking torque.

In the deriving of required target regenerative braking torque, when the fuel cell vehicle rolls, the controller may derive target regenerative braking torque according to a propelling requirement value and a vehicle speed of the fuel cell vehicle.

The controller may have a data map that outputs corresponding target regenerative braking torque when a propelling requirement value and a vehicle speed of the fuel cell vehicle are input in the deriving of required target regenerative braking torque.

In the generating of braking torque, the controller may calculate available regenerative braking torque of the driving motor on the basis of a state of charge of a battery.

In the generating of braking torque, when the available regenerative braking torque of the driving motor is insufficient in comparison to the target regenerative braking torque, the controller may control the driving motor to be driven with minimum allowable regenerative braking torque.

According to the control system and method for a fuel cell vehicle of embodiments of the present disclosure, since when available regenerative braking torque of a driving motor is insufficient in comparison to target regenerative braking torque, the shortage is supplemented with braking torque, there is an effect that a vehicle can escape a rolling situation even though recovery of energy by regenerative braking of the driving motor is impossible when the fuel cell vehicle rolls on a slope.

Further, when a fuel cell vehicle rolls on a slope and recovery of energy by regenerative braking of the driving motor is impossible, a brake system is controlled to generate braking force, whereby there is an effect that stability in driving of the fuel cell vehicle on a slope is secured.

BRIEF DESCRIPTION OF THE DRAWINGS

The above and other objectives, features and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

In the following description, when it is decided that the detailed description of known technologies related to the present disclosure makes the subject matter of the embodiments described herein unclear, the detailed description is omitted. Further, the accompanying drawings are provided only for easy understanding of embodiments disclosed in the specification, the technical spirit disclosed in the specification is not limited by the accompanying drawings, and all changes, equivalents, and replacements should be understood as being included in the spirit and scope of the present disclosure.

Terms including ordinal numbers such as "first", "second", etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having yet another element intervening therebetween. On the other hand, it should to be understood that when one element is referred to as being "connected directly to" or "coupled directly to" another element, it may be connected to or coupled to another element without the yet another element intervening therebetween.

Singular forms are intended to include plural forms unless the context clearly indicates otherwise.

It will be further understood that the terms "comprises" or "have" used in this specification specify the presence of stated features, steps, operations, components, parts, or a combination thereof, but do not preclude the presence or addition of one or more other features, numerals, steps, operations, components, parts, or a combination thereof.

Hereafter, embodiments of the present disclosure will be described in detail with reference to the accompanying drawings and the same or similar components are given the same reference numerals regardless of the numbers of figures and are not repeatedly described.

Figure 1:
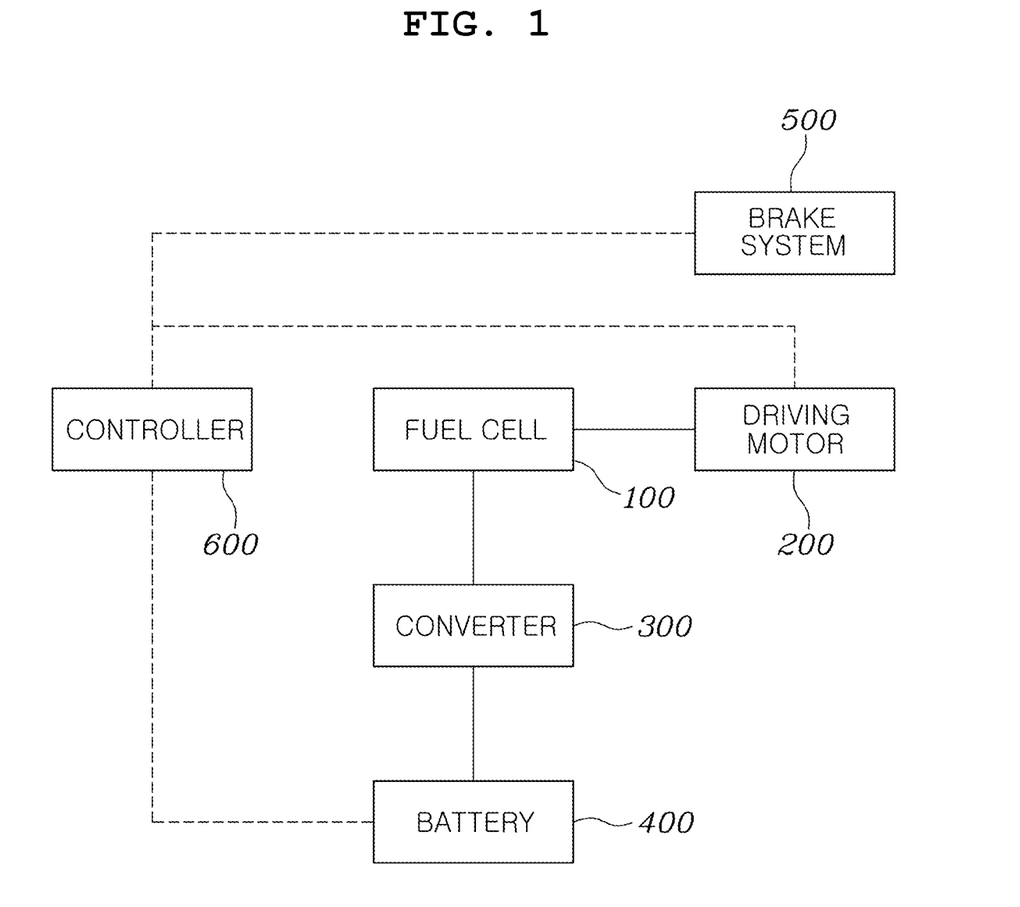
FIG. 1 is a configuration diagram of a control system for a fuel cell vehicle according to an embodiment of the present disclosure.
Figure 2:
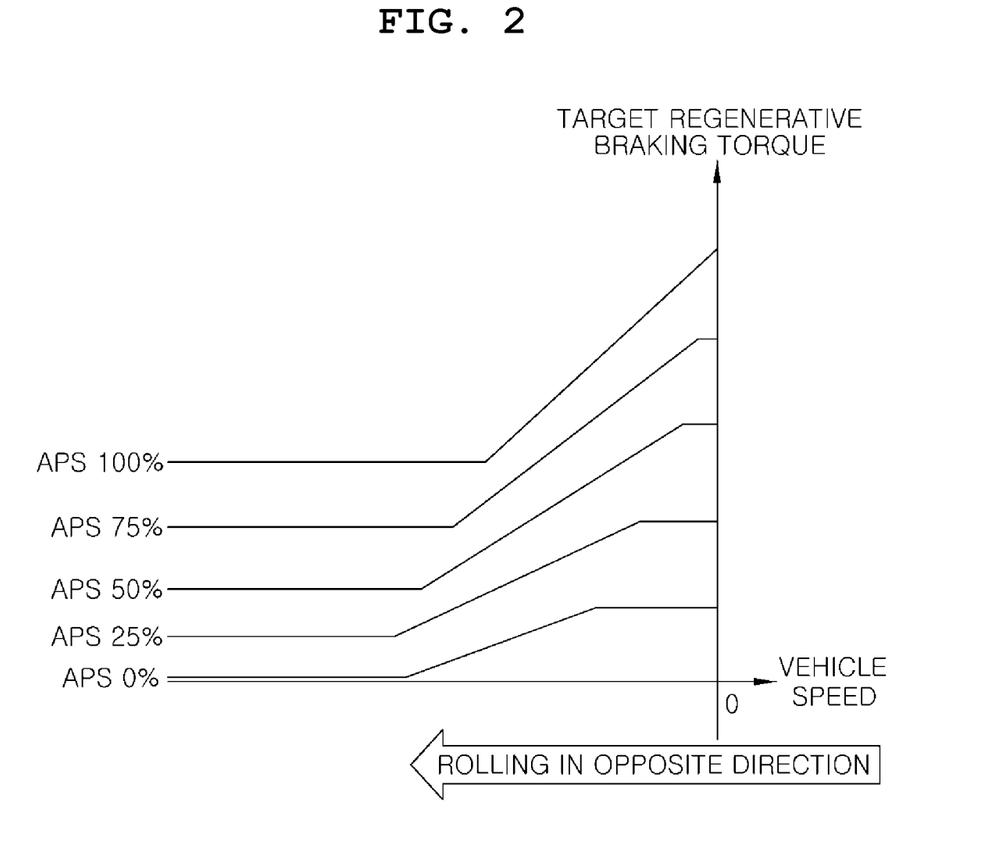
FIG. 2 is a target regenerative braking torque graph according to the APS opening and a vehicle speed of a fuel cell vehicle according to an embodiment of the present disclosure.
Figure 3:
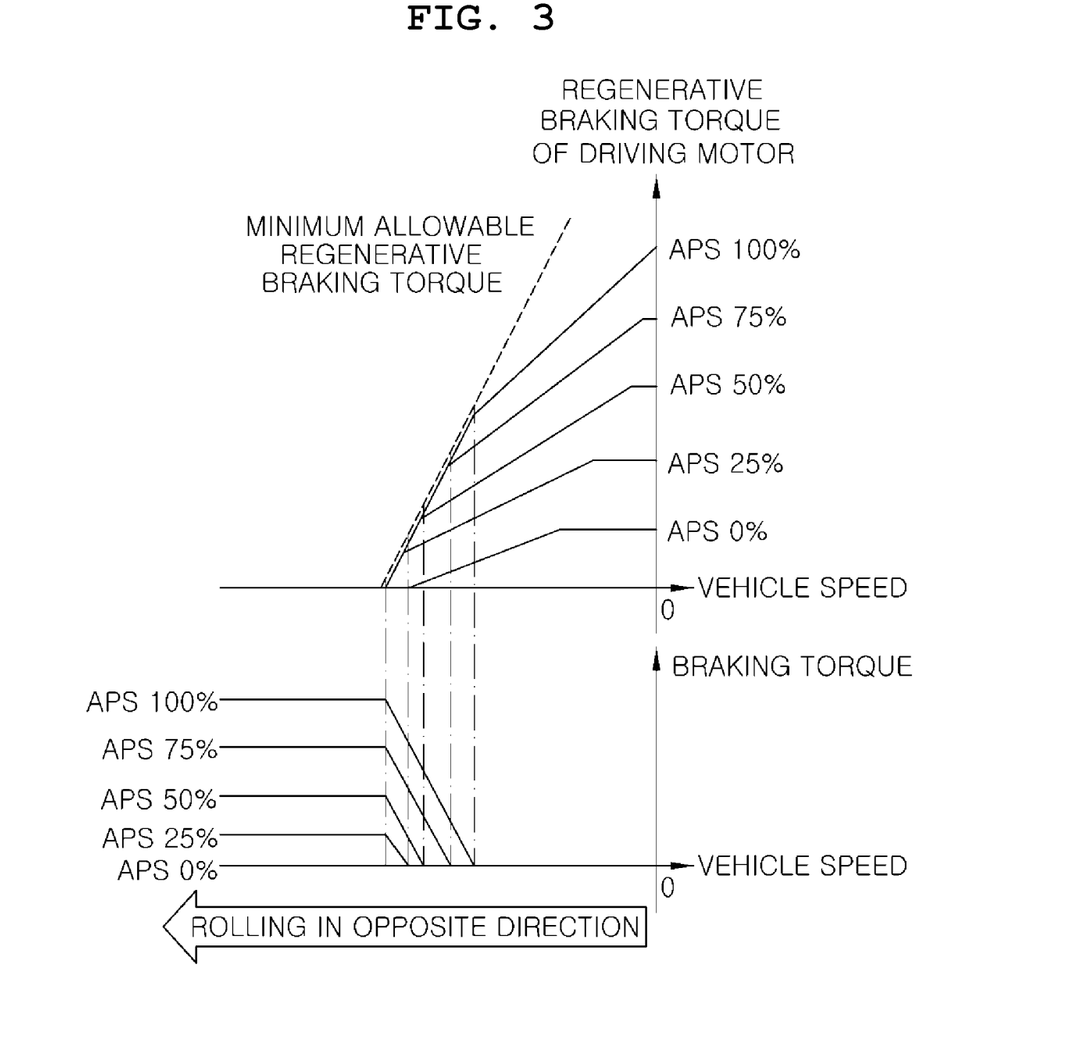
FIG. 3 is a graph showing regenerative braking torque of a driving motor and braking torque of a brake system according to the APS opening and a vehicle speed of a fuel cell vehicle according to an embodiment of the present disclosure.
Figure 4:
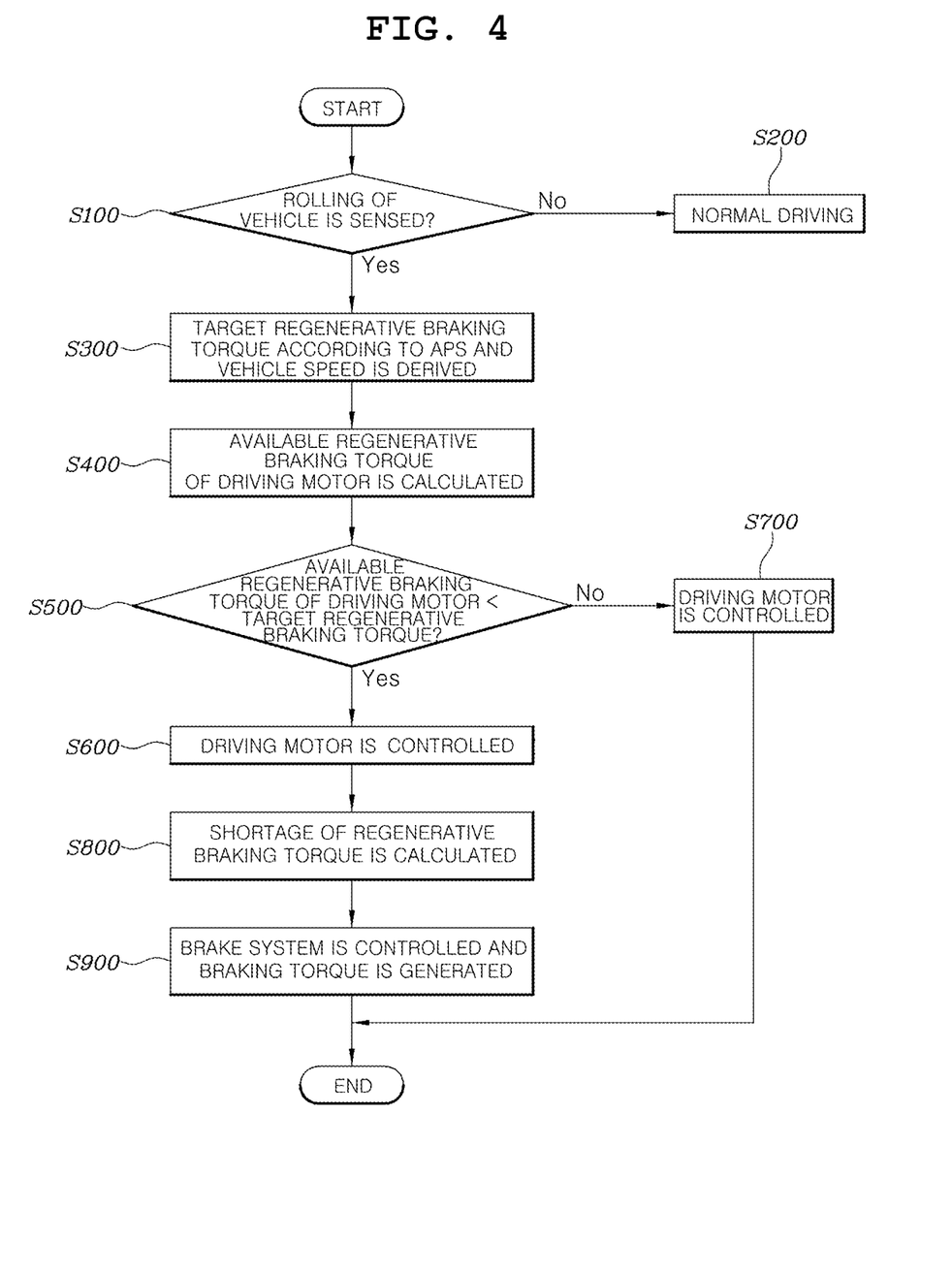
FIG. 4 is a flowchart of a control method for a fuel cell vehicle according to an embodiment of the present disclosure.

FIG. 1 is a configuration diagram of a control system for a fuel cell vehicle according to an embodiment of the present disclosure, FIG. 2 is a target regenerative braking torque graph according to the APS opening and a vehicle speed of a fuel cell vehicle according to an embodiment of the present disclosure, FIG. 3 is a graph showing regenerative braking torque of a driving motor and braking torque of a brake system according to the APS opening and a vehicle speed of a fuel cell vehicle according to an embodiment of the present disclosure, and FIG. 4 is a flowchart of a control method for a fuel cell vehicle according to an embodiment of the present disclosure.

FIG. 1 is a configuration diagram of a control system of a fuel cell vehicle according to an embodiment of the present disclosure. A control system for a fuel cell vehicle according to an embodiment of the present disclosure includes a driving motor 200 of the fuel cell vehicle, a brake system 500 of the fuel cell vehicle, and a controller 600 that derives target regenerative braking torque that is required when the fuel cell vehicle rolls in the opposite direction to the traveling direction on a slope and generates regenerative torque by controlling the brake system 500 as much as insufficient regenerative braking torque when the fuel cell vehicle rolls in the opposite direction to the traveling direction and available regenerative braking torque of the driving motor 200 is insufficient in comparison to target regenerative braking torque.

The controller 600 according to exemplary embodiments of the present disclosure can be implemented through a nonvolatile memory (not shown) configured to store algorithms for controlling operation of various components of a vehicle or data about software commands for executing the algorithms, and a processor (not shown) configured to perform operations to be described below using the data stored in the memory. The memory and the processor may be individual chips. Alternatively, the memory and processor may be integrated into a single chip, and the processor may be one or more processors.

As shown in FIG. 1, the fuel cell vehicle is driven by providing electrical energy generated by power generation of a fuel cell 100 to the driving motor 200. The fuel cell vehicle includes a battery 400, so it is possible to drive the driving motor 200 using power stored in the battery 400 when the output of the fuel cell 100 is insufficient. The fuel cell vehicle is controlled to be decelerated through regenerative braking when a braking function is performed. Kinetic energy that is generated when a fuel cell vehicle is driven is not consumed as heat energy through a brake, but is converted into electrical energy through regenerative braking, whereby the converted electrical energy is reused as a power source. When regenerative braking is performed, the driving motor 200 is not provided with power from the fuel cell 100 or the battery 400 and provides generated electrical energy to the battery 400. Accordingly, the fuel cell vehicle performs regenerative braking in consideration of the state of charge of the battery 400.

When a vehicle that is driven on a slope rolls in the opposite direction to the traveling direction, the driver depresses the accelerator pedal to escape the rolling situation. In general, a vehicle is accelerated in the intended traveling direction by acceleration against acceleration due to rolling. A fuel cell vehicle performs regenerative braking in the process of overcoming acceleration due to rolling, and after deceleration by regenerative braking, the vehicle is accelerated in the traveling direction. However, the state of charge of the battery 400 of the fuel cell vehicle should be considered when regenerative braking is performed, and accordingly, there is a problem that regenerative braking is not completely performed. When regenerative braking is not completely performed, there is a problem that the speed of the fuel cell vehicle that rolls in the opposite direction increases and the fuel cell vehicle cannot escape the rolling situation.

Therefore, according to embodiments of the present disclosure, when a fuel cell vehicle rolls in the opposite direction to the traveling direction on a slope, target regenerative braking torque is checked, and when available regenerative braking torque of the driving motor 200 is insufficient in comparison to the target regenerative braking torque, the shortage is supplemented with braking force so that the fuel cell vehicle can escape the rolling situation.

When a vehicle that is being driven on a slope rolls in the opposite direction to the traveling direction, the controller 600 derives target regenerative braking torque according to a propelling requirement value and the vehicle speed of the fuel cell vehicle. The controller 600 may have a data map that outputs corresponding target regenerative braking torque when the propelling requirement value and the vehicle speed of the fuel cell vehicle are input. The propelling requirement value may be a sensor value of an accelerator position sensor (APS). When a vehicle that is being driven on a slope rolls in the opposite direction to the traveling direction, the driver depresses the accelerator pedal to escape the rolling situation of the vehicle. As the driver depresses the accelerator pedal, a propelling requirement value of the vehicle is input and the controller 600 checks the input propelling requirement value. The controller 600 measures a vehicle speed due to rolling of the fuel cell vehicle on the slope. The controller 600 can derive target regenerative braking torque according to the propelling requirement value and the vehicle speed of the fuel cell vehicle using the separately provided data map.

FIG. 2 is a target regenerative braking torque graph according to the APS opening and a vehicle speed of a fuel cell vehicle according to an embodiment of the present disclosure. It can be seen from the graph of FIG. 2 that as the vehicle speed increases, the target regenerative braking torque decreases. When the accelerator pedal is depressed to escape a rolling situation in which the fuel cell vehicle rolls in the opposite direction, the controller 600 controls the driving motor 200 to perform regenerative braking such that a stopped state without a vehicle speed due to rolling is made and then the vehicle is driven in the traveling direction. Limitation may exist in regenerative braking torque of the driving motor 200 according to a vehicle speed, and due to the limitation, as shown in FIG. 2, target regenerative braking torque can decrease with an increase of the vehicle speed and then can be maintained as a specific target regenerative braking torque value when reaching a specific value.

After deriving target regenerative braking torque, the controller 600 compares the magnitudes of the available regenerative braking torque of the driving motor 200 and the target regenerative braking torque. For comparison with the magnitude of the target regenerative braking torque, the controller 600 needs to calculate the available regenerative braking torque of the driving motor 200. Accordingly, the control system for a fuel cell vehicle of embodiments of the present disclosure further includes a battery 400 that stores electrical energy that is generated when regenerative braking is performed in the fuel cell vehicle, and the controller 600 calculates available regenerative braking torque of the driving motor 200 on the basis of the state of charge of the battery 400. The controller 600 needs to calculate available regenerative braking torque, which is required when the driving motor 200 performs regenerative braking, on the basis of the battery 400 disposed in the fuel cell vehicle.

Referring to FIG. 1, the battery 400 disposed in the fuel cell vehicle is connected with a converter 300 and provides output to the vehicle through the converter 300, or stores electrical energy generated through regenerative braking by the driving motor 200. In order for the battery 400 to store the electrical energy generated through regenerative braking by the driving motor 200, the battery 400 should be in a state in which it can store electrical energy by regenerative braking. When the battery 400 is not in an overcharged state or a non-chargeability state, the level at which electrical energy by regenerative braking of the driving motor 200 can be stored is limited. Since the level at which electrical energy by regenerative braking can be stored, there may be a problem that the driving motor 200 does not completely perform regenerative braking.

In particular, when a fuel cell vehicle that is being driven on a slope rolls in the opposite direction to the traveling direction, the driver depresses the accelerator pedal to escape rolling. As the accelerator pedal is depressed, a signal is input to the driving motor 200 in the forward direction, but the driving motor 200 is rotating in the backward direction due to rolling of the vehicle. Accordingly, the driving motor 200 performs regenerative braking to be driven in the forward direction when finishing backward rotation. However, when the battery 400 is excessively charged or cannot be charged, regenerative braking of the driving motor 200 is not completely performed. Accordingly, the fuel cell vehicle cannot escape rolling on the slope, so the vehicle keeps rolling or accelerating in the opposite direction, which causes a problem with the stability in driving of the vehicle.

Accordingly, in embodiments of the present disclosure, the available regenerative braking torque of the driving motor 20 according to the state of charge of the battery 400 is calculated by checking the state of charge of the battery 400. Further, by comparing the available regenerative braking torque of the driving motor 200 and the target regenerative braking torque with each other, there is an effect of preparing for the state in which the driving motor 200 cannot completely perform regenerative braking.

Meanwhile, FIG. 3 is a graph showing regenerative braking torque of a driving motor and braking torque of a brake system according to the APS opening and a vehicle speed of a fuel cell vehicle according to an embodiment of the present disclosure. The controller 600 calculates available regenerative braking torque of the driving motor 200 and compares the magnitudes of the available regenerative braking torque of the driving motor 200 and the target regenerative braking torque. When the available regenerative braking torque of the driving motor 200 is insufficient in comparison to the target regenerative braking torque, the controller 600 controls the brake system 500 as much as the insufficient regenerative braking torque. When the available regenerative braking torque of the driving motor 200 is insufficient in comparison to the target regenerative braking torque, the controller 600 controls the driving motor 200 to be driven with minimum allowable regenerative braking torque. According to embodiments of the present disclosure, when a fuel cell vehicle rolls on a slope, the controller 600 derives target regenerative braking torque and controls the driving motor 200 to generate torque as much as the derived target regenerative braking torque. However, the regenerative braking torque generated by the driving motor may not reach the target regenerative braking torque, depending on the state of charge of the battery 400.

Accordingly, in embodiments of the present disclosure, after the available regenerative braking torque of the driving motor 200 is calculated and compared with the target regenerative braking torque, when the available regenerative braking torque of the driving motor 200 is insufficient in comparison to the target regenerative braking torque, it is required to supplement the insufficient torque using the brake system 500.

Even though the available regenerative braking torque of the driving motor 200 is insufficient in comparison to the target regenerative braking torque, the driving motor 200 needs to necessarily perform regenerative braking. When regenerative braking of the driving motor 200 is prevented for the reason that the available regenerative braking torque of the driving motor 200 is insufficient in comparison to the target regenerative braking torque, a problem is generated with driving of the vehicle. Even when a fuel cell vehicle slightly rolls on a slope with a small inclination, the vehicle cannot escape rolling, and since the fuel cell vehicle cannot escape rolling, the vehicle cannot be normally driven.

Accordingly, when the available regenerative braking torque of the driving motor 200 is insufficient in comparison to the target regenerative braking torque, the controller 600 needs to control the driving motor 200 to be driven with minimum allowable regenerative braking torque. In this case, the minimum allowable regenerative braking torque may be a minimum value of the regenerative braking torque of the driving motor 200 that is unconditionally allowed regardless of the state of charge of the battery in the period in which the vehicle speed of the fuel cell vehicle is low.

As described above, in order to solve the problem that is generated when regenerative braking of the driving motor 200 is prevented, as an embodiment, it may be possible to allow for regenerative braking of the driving motor 200 regardless of the state of charge of the battery 400 when the vehicle speed of the fuel cell vehicle is low. In detail, as an embodiment, the controller 600 can set an upper limit of a current that is generated by regenerative braking or the driving motor 200 in a period in which the vehicle speed of the fuel cell vehicle is low due to rolling. Referring to the graph of FIG. 3, as an embodiment, the controller 600 can set a minimum allowable regenerative braking torque of the driving motor 200. When the available regenerative braking torque of the driving motor 200 is insufficient in comparison to the target regenerative braking torque, the controller 600 controls the driving motor 200 to generate at least the minimum allowable regenerative braking torque.

Further, when the available regenerative braking torque of the driving motor 200 is insufficient in comparison to the target regenerative braking torque, the controller 600 controls the brake system 500 as much as the regenerative braking torque of the driving motor 200, thereby generating braking torque. That is, the shortage of the regenerative braking torque of the driving motor 200 is supplemented with braking torque of the brake system 500. The graph at the lower portion in FIG. 3 shows the amounts of braking torque that will be generated by the brake system 500 in accordance with the minimum allowable regenerative braking torque of the driving motor 200 set in the upper graph. The reason that there is a section in which the braking torque value is constant in the braking torque graph is because, as described above, there is a limit in regenerative braking torque of the driving motor 200. Accordingly, even though the shortage of the regenerative braking torque of the driving motor 200 is supplemented with braking torque, the supplementing braking torque cannot exceed the regenerative braking torque of the driving motor 200.

As a result, when a fuel cell vehicle rolls in the opposite direction to the traveling direction on a slope, the controller 600 derives a target regenerative braking torque. Further, the controller 600 compares the available regenerative braking torque, which is generated when the driving motor 200 performs regenerative braking, with the target regenerative braking torque, and controls the brake system 500 when the available regenerative braking torque is insufficient in comparison to the target regenerative braking torque. In this case, the controller 600 controls the brake system 500 to generate braking torque as much as the insufficient regenerative braking torque of the driving motor 200. Accordingly, when overlapping the regenerative braking torque graph of the driving motor 200 at the upper portion in FIG. 3 and the braking torque graph of the brake system 500 at the lower portion in FIG. 3, it can be seen that the target regenerative braking torque shown in FIG. 2 is obtained. Accordingly, there is an effect in embodiments of the present disclosure that stability in driving of a fuel cell vehicle on a slope is secured by supplementing the shortage of the regenerative braking torque of the driving motor 200 with braking torque.

Meanwhile, FIG. 4 is a flowchart of a control method of a fuel cell vehicle according to an embodiment of the present disclosure. A control method for a fuel cell vehicle according to embodiments of the present disclosure includes deriving required target regenerative braking torque using the controller 600 when the fuel cell vehicle rolls in the opposite direction to the traveling direction on a slope (S300) and, when available regenerative braking torque of the driving motor 200 is insufficient in comparison to target regenerative braking torque, generating braking torque as much as the insufficient regenerative braking torque by controlling the brake system 500 using the controller 600 (S900).

First, the controller 600 checks whether the fuel cell vehicle enters a slope and rolls in the opposite direction to the traveling direction (S100). In particular, the controller 600 checks whether a driver has depressed the accelerator pedal without depressing the brake pedal while the fuel cell vehicle rolls. This state is a precondition for performing the control method for a fuel cell vehicle of embodiments of the present disclosure. When it is not sensed that the fuel cell vehicle rolls, the controller 600 performs control such that the vehicle is normally driven (S200).

When the vehicle rolls, the driving motor 200 performs regenerative braking in the process of decelerating the vehicle to escape the rolling situation. In the deriving of a target regenerative braking torque (S300), the controller 600 derives the target regenerative braking torque according to a propelling requirement value and a vehicle speed of the fuel cell vehicle when the fuel cell vehicle rolls.

Further, in the deriving of the target regenerative braking torque (S300), the controller 600 may have a data map that outputs corresponding target regenerative braking torque when the propelling requirement value and the vehicle speed of the fuel cell vehicle are input. As an embodiment, the propelling requirement value of the fuel cell vehicle is a sensing value that is sensed through an accelerator position sensor (APS). Accordingly, in embodiments of the present disclosure, the controller 600 derives target regenerative braking torque according to the current APS sensing value and the vehicle speed through the data map when the fuel cell vehicle rolls.

After deriving the target regenerative braking torque, the controller 600 controls the driving motor 200 to be driven with the target regenerative braking torque. However, when the state of charge of the battery 400 in the fuel cell vehicle is a non-chargeability state due to overcharging, the electrical energy that is generated by regenerative braking of the driving motor 200 cannot be entirely stored in the battery 400. Only a portion of the electrical energy generated by regenerative braking of the driving motor 200 is stored in the battery 400, so the driving motor 200 cannot completely perform regenerative braking.

Accordingly, in the generating of braking torque (S900), the controller 600 calculates available regenerative braking torque of the driving motor 200 on the basis of the state of charge of the battery 400 (S400). The controller 600 checks the current state of charge of the battery 400 and calculates the available regenerative braking torque of the driving motor 200 on the basis of the state of charge. The available regenerative braking torque of the driving motor 200 means the torque at a level that can be allowed when the driving motor 200 performs regenerative braking in accordance with the state of charge of the battery 400.

Thereafter, the controller 600 compares the available regenerative braking torque of the driving motor 200 with the target regenerative braking torque (S500). The controller 600 controls the driving motor 200 in different ways, depending on the result of comparing the torque (S600 and S700). In the generating of braking torque (S900), when the available regenerative braking torque of the driving motor 200 is insufficient in comparison to the target regenerative braking torque (i.e., when the available regenerative braking torque of the driving motor 200 is less than the target regenerative braking torque), the controller 600 controls the driving motor 200 to be driven with a minimum allowable regenerative braking torque (S600). The minimum allowable regenerative braking torque may be a minimum value of the regenerative braking torque of the driving motor 200 that is unconditionally allowed regardless of the state of charge of the battery in the period in which the vehicle speed of the fuel cell vehicle is low. The controller 600 calculates the shortage of the regenerative braking torque of the driving motor 200 (S800), and controls the brake system 500 to generate braking torque as much as the shortage of the regenerative braking torque of the driving motor 200 (S900). When a fuel cell vehicle rolls and regenerative braking of the driving motor 200 is not performed well due to the state of charge of the battery 400, the shortage is supplemented by the brake system 500, whereby there is an effect that stability in driving of the vehicle is secured.

When the available regenerative braking torque of the driving motor 200 is not less than the target regenerative braking torque, the regenerative braking can be sufficiently performed by the current regenerative braking torque of the driving motor 200. Accordingly, in this case, the controller 600 controls the driving motor 200 to be driven with the target regenerative braking torque (S700).

According to the control system and method for a fuel cell vehicle of embodiments of the present disclosure, since when available regenerative braking torque of a driving motor is insufficient in comparison to target regenerative braking torque, the shortage is supplemented with braking torque, there is an effect that a vehicle can escape a rolling situation even though recovery of energy by regenerative braking of the driving motor is impossible when the fuel cell vehicle rolls on a slope.

Further, when a fuel cell vehicle rolls on a slope and recovery of energy by regenerative braking of the driving motor is impossible, a brake system is controlled to generate braking force, whereby there is an effect that stability in driving of the fuel cell vehicle on a slope is secured.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A control system for a fuel cell vehicle, the control system comprising:
   a driving motor of the fuel cell vehicle;
   a brake system of the fuel cell vehicle; and
   a controller configured to:
   derive a required target regenerative braking torque while the fuel cell vehicle rolls in an opposite direction to a traveling direction on a slope; and
   when an available regenerative braking torque of the driving motor is less than the required target regenerative braking torque, control the brake system to generate braking torque by as much as a difference between the required target regenerative braking torque and the available regenerative braking torque.

2. The control system of claim 1, wherein the controller is configured to derive the required target regenerative braking torque according to a propelling requirement value and a vehicle speed of the fuel cell vehicle.

3. The control system of claim 2, wherein the propelling requirement value comprises a sensing value of an accelerator position sensor.

4. The control system of claim 2, wherein the controller comprises a data map configured to output the corresponding required target regenerative braking torque in response to the propelling requirement value and the vehicle speed of the fuel cell vehicle being input.

5. The control system of claim 1, further comprising a battery configured to store electrical energy that is generated when regenerative braking is performed in the fuel cell vehicle.

6. The control system of claim 5, wherein the controller is configured to calculate the available regenerative braking torque of the driving motor based on a state of charge of the battery.

7. The control system of claim 1, wherein when the available regenerative braking torque of the driving motor is less than the required target regenerative braking torque, the controller is configured to control the driving motor to be driven with a minimum allowable regenerative braking torque.

8. The control system of claim 7, wherein the minimum allowable regenerative braking torque comprises a minimum value of the regenerative braking torque of the driving motor that is unconditionally allowed regardless of a state of charge of a battery of the fuel cell vehicle in a period in which a vehicle speed of the fuel cell vehicle is low.

9. A control method for a fuel cell vehicle, the control method comprising:
deriving a required target regenerative braking torque while the fuel cell vehicle rolls in an opposite direction to a traveling direction on a slope;
determining that an available regenerative braking torque of a driving motor is less than the required target regenerative braking torque; and
in response to the determining, controlling a brake system to generate braking torque by as much as a difference between the required target regenerative braking torque and the available regenerative braking torque.

10. The control method of claim 9, wherein, deriving the required target regenerative braking torque comprises deriving the required target regenerative braking torque according to a propelling requirement value and a vehicle speed of the fuel cell vehicle.

11. The control method of claim 10, wherein the propelling requirement value comprises a sensing value of an accelerator position sensor.

12. The control method of claim 9, further comprising outputting from a data map the corresponding target regenerative braking torque in response to an input of a propelling requirement value and a vehicle speed of the fuel cell vehicle.

13. The control method of claim 9, further comprising calculating the available regenerative braking torque of the driving motor based on a state of charge of a battery of the fuel cell vehicle.

14. The control method of claim 9, further comprising controlling the driving motor to be driven with a minimum allowable regenerative braking torque.

15. The control method of claim 14, wherein the minimum allowable regenerative braking torque comprises a minimum value of the regenerative braking torque of the driving motor that is unconditionally allowed regardless of a state of charge of a battery of the fuel cell vehicle in a period in which a vehicle speed of the fuel cell vehicle is low.

16. A fuel cell vehicle comprising:
a fuel cell;
a driving motor;
a brake system;
a battery; and
a controller configured to:
derive a target regenerative braking torque for overcoming rolling of the fuel cell vehicle while the fuel cell vehicle rolls in an opposite direction to a traveling direction on a slope;
calculate an available regenerative braking torque of the driving motor;
compare the target regenerative braking torque and the available regenerative braking torque; and
in response to the available regenerative braking torque of the driving motor being less than the target regenerative braking torque, control the brake system to generate braking torque by as much as a difference between the target regenerative braking torque and the available regenerative braking torque.

17. The fuel cell vehicle of claim 16, wherein the controller is configured to derive the target regenerative braking torque according to a propelling requirement value and a vehicle speed of the fuel cell vehicle.

18. The fuel cell vehicle of claim 17, wherein the propelling requirement value of the fuel cell vehicle comprises a sensing value of an accelerator position sensor.

19. The fuel cell vehicle of claim 16, wherein the controller is configured to calculate the available regenerative braking torque of the driving motor based on a state of charge of the battery.

20. The fuel cell vehicle of claim 16, wherein, in response to the available regenerative braking torque of the driving motor being less than the target regenerative braking torque, the controller is configured to control the driving motor to be driven with a minimum allowable regenerative braking torque.

* * * * *